April 7, 1970 L. WEGMANN ETAL 3,505,521
ELECTRON EMISSION MICROSCOPE OBJECT MANIPULATOR
Filed Jan. 3, 1967 9 Sheets-Sheet 1

INVENTORS:
Lienhard Wegmann
BY and Rolf Graber,
Ernest␣. Marmorek,
ATTORNEY

April 7, 1970   L. WEGMANN ETAL   3,505,521
ELECTRON EMISSION MICROSCOPE OBJECT MANIPULATOR
Filed Jan. 3, 1967   9 Sheets-Sheet 5

INVENTORS:
Lienhard Wegmann
and Rolf Graber,
BY
ATTORNEY.

INVENTORS:
Lienhard Wegmann
and Rolf Graber,
BY
ATTORNEY.

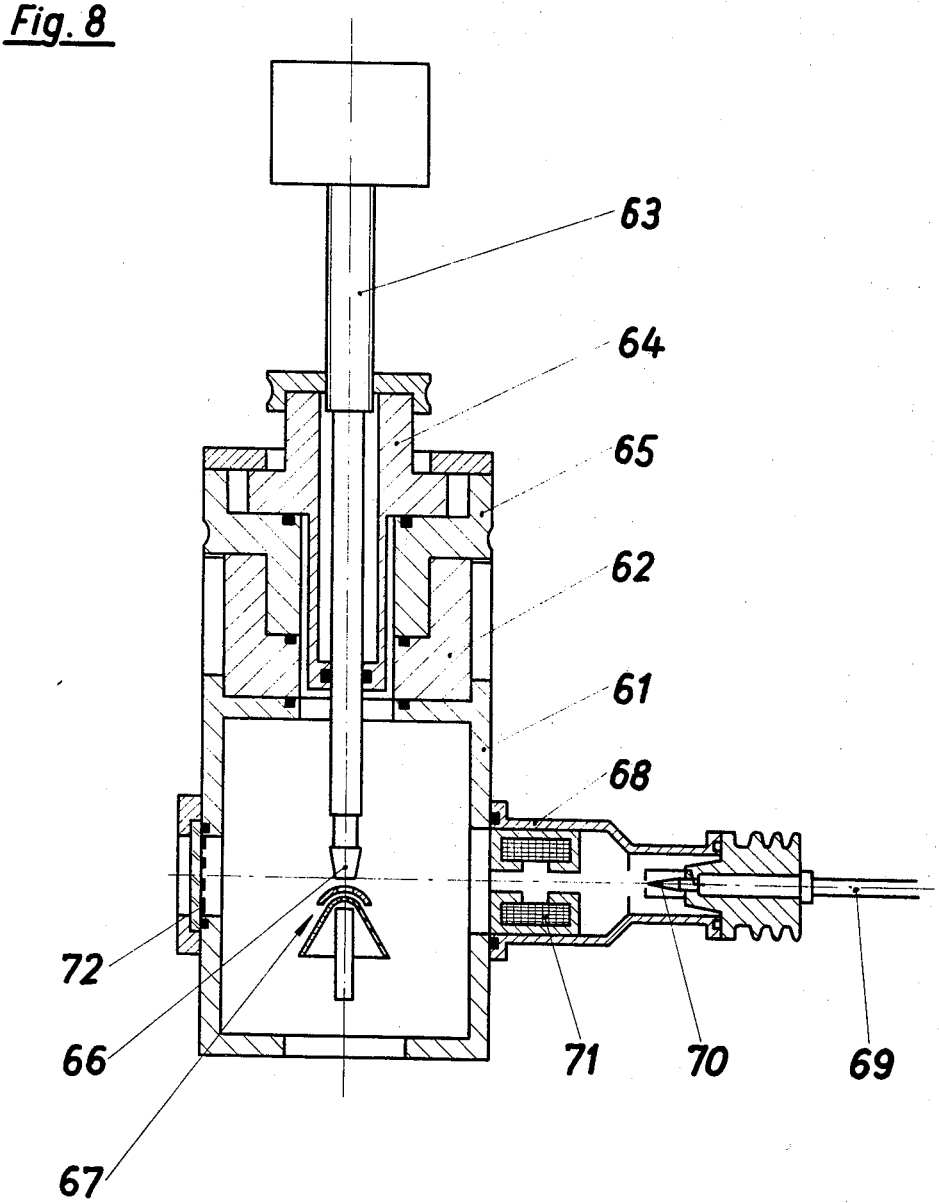

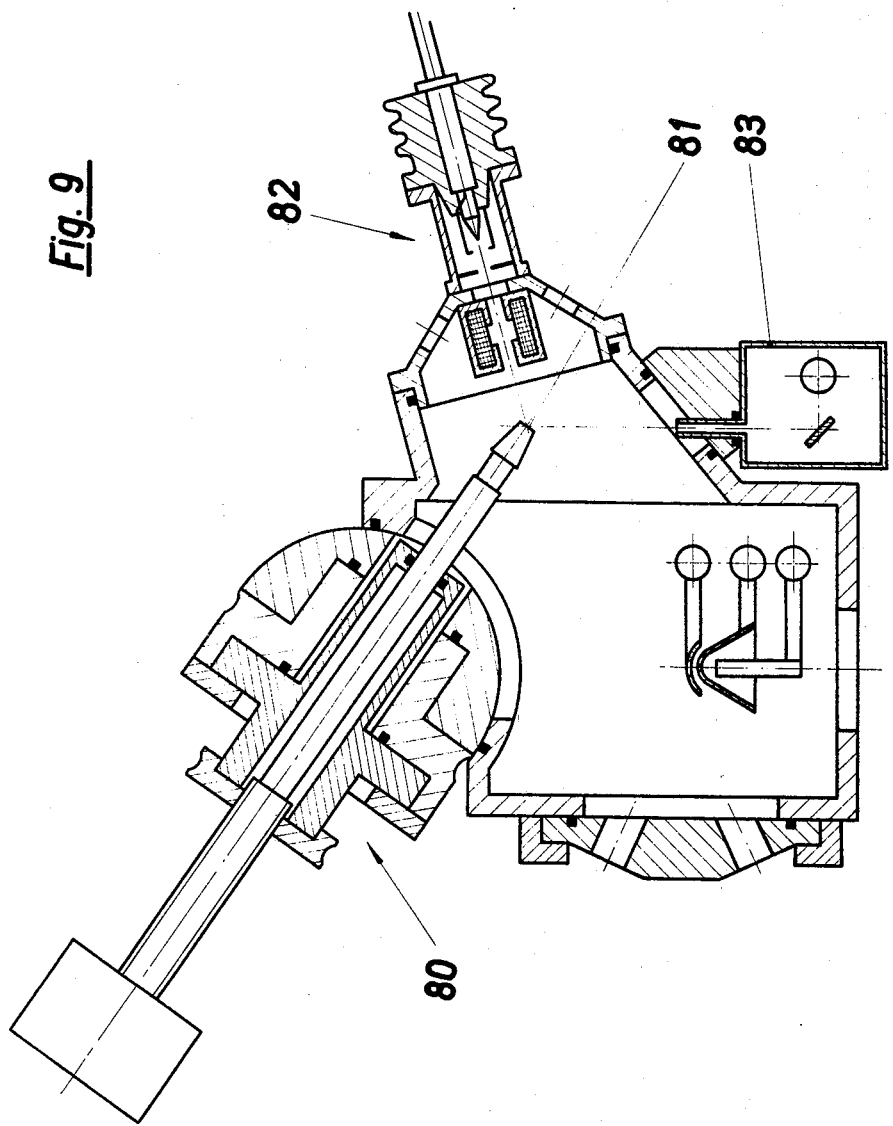

ized Patent Office                                                  3,505,521
                                                                  Patented Apr. 7, 1970

3,505,521
ELECTRON EMISSION MICROSCOPE OBJECT MANIPULATOR
Lienhard Wegmann, Trubbach, and Rolf Graber, Buchs, Switzerland, assignors to Balzers Patent- und Lizenz-Anstalt Balzers, Liechtenstein, a body corporate of Liechtenstein
Filed Jan. 3, 1967, Ser. No. 606,775
Int. Cl. H01j 37/26
U.S. Cl. 250—49.5                                    30 Claims

ABSTRACT OF THE DISCLOSURE

An electron emission microscope comprising an evacuable tubular body, objective- and projection-lenses, a luminescent screen and/or photographic device, an object holder for an object kept on high voltage and capable of being heated, a compound table for the translation and a device for the rotating of the object, independent sources of ions, electrons and ultra-violet rays each producing alternately or simultaneously a beam directed on the surface of the object, an electricity supply and an evacuation plant, and means for operating the electron emission microscope, wherein the said object holder is mounted pivotally and wherein at least one auxiliary device is provided for the treatment, observation and/or insertion and removal through an air lock of the object to be treated in a position swung out of the range of the said objective lens.

---

The present invention relates to improvements in electron emission microscope.

An electron emission microscope as known from the literature (conf. U.S.A. patent specification No. 3,219,817) comprises substantially the following electron-optical features as diagrammatically illustrated in the accompanying FIG. 1:

A tubular body 1 capable of being evacuated to a high vacuum contains an electrostatic or electromagnetic objective lens 2 (immersion objective lens), one or more projection lenses 3, a luminous screen 4, a photographic device 5 for the direct recording of the electron image or for luminous screen photography, an object holder 6 and an object 7, whose surfaces is projected on the luminous screen by the said lenses. The electron emission microscope has won introduction in particular for the investigation of objects at varying temperatures, for which purpose in the object holder a device 8 for heating the object by means of resistors or electron bombardment is provided as well as advantageously a thermo-electric couple 9 for measuring the temperature. The object holder 6 and the object 7 are kept in operation at a high negative voltage potential while the tubular body 1 is preferably earthed. At temperatures approaching or exceeding 1000° C., thermal electrons make the formation of an emission image possible. Below these temperatures, secondary electrons have to be generated by impact on the surface of the object of ions from a source of ions 10 or of electrons from a source of electrons 11 or by irradiation thereof with ultra-violet rays. The microscope is associated with a high vacuum plant for the evacuation of the tubular body 1 and an electrical plant for generating the high voltages for the object, for the ion source, for the electron source and electro-static lenses as for generating the currents energising the electro-magnetic lenses and the remaining operational elements. In order to allow the comparatively large area of the surface of the object to be illustrated by projection, the object holder is arranged slidably in two co-ordinates on a compound table 12. Of great advantage is a device 13 for rotating the object, since only thereby the possibilities can be fully exploited, which are offered for differentiation of orientation (dependence of the emission factor on the orientation of a crystallite with respect to the impinging ion-, electron- or ultra-violet ray beam) as well as the shadow effect by oblique irradiation with ions, electrons or ultra-violet rays. In order to allow a sensible adaptation of this oblique irradiation to the uneveness of the surface of the object, the sources 10, 11, of ions, electrons or ultra-violet rays are usually arranged pivotally in such a manner that the angle of incidence of the beam on the object may be varied from zero (tangential incidence) up to about 20° or 25°. A steeper incidence is impossible because of limitation by the objective electrodes 2. The change of the objective is effected by taking out the object holder 6 through the compound table 12 while letting air into the tubular body, or with the use of an air lock for the object holder built-in underneath the compound table 12.

The electron emission microscope is used predominantly for observing the transformations of the structure of objects upon variations in temperature. The object is heated or cooled and the crystalline transformations taking place in the interior of the object are observed and interrupted from the appearance of the phenomena on the surface of the object. In a few cases this is possible without special treatment of the surface, namely when the transformation manifests itself in comparatively strong variations of the emission factors. In most cases however, the internal structure becomes recognisable on the surface only or predominantly from a surface topography produced by etching. Accordingly, when a transformation is to become recognisable, the surface has to be etched continuously. At temperatures above say 1000° C. ion etching is used for this purpose. At major intensities of the ion beam from the ion source 10 the surface atoms are scattered by the ion bombardment, and successive erosions of the surface take place. The use of one and the same ion source 10 as known hitherto for the release of secondary electrons and for ion etching constitutes, however, in some respects an unfavourable compromise; thus the intensity of the beam current and the beam voltage for the etching should be chosen different from those for the electron release, which is impossible to achieve to a sufficient degree with the use of a single ion source; the optimum angles of incidence of the ions lie between 30° and 90° for etching, which cannot be realised owing to limitation by the objective lens 2, and the surface-atoms and molecules scattered by the etching are deposited predominantly on the objective electrodes 2, whereby within a short time fouling of the objective lens takes place and the high voltage strength thereof is substantially reduced.

The present invention has the primary object of overcoming these disadvantages of the known electron emission microscopes, and in particular to obviate the fouling of the objective lens and the exposure of the interior of the tubular body of the microscope to atmospheric air, when changing the objects investigated.

With these and other objects in view which will become apparent from the following description of some embodiments of the present invention and the accompanying drawings, we provide an electron emission microscope comprising in combination: an evacuable tubular body, at least one objective electron lens and one projection electron lens arranged in said tubular body, a compound table arranged at one end of said tubular body, an object holder mounted pivotally and rotatably on said compound table capable of being adjusted in two perpendicular co-ordinate directions by said compound table and to be swung into and out of the optical axis of the microscope as defined by said objective and projection lenses, a device operatively connected with said object holder and capable in operation of rotating the same about its axis, means for setting in operation the object attached to said object holder at a high negative voltage potential relative to said tubular body, means for heating in operation said object, a source of radiation in operation producing a beam directed on the surface of said object, an air lock arranged on said tubular body in a direction towards the pivotal mounting of said object holder and at an angle to the optical axis of the microscope and a luminous screen and photographic device arranged at the other end of said tubular body.

The said source of radiation may be a source of an ion- or electron-bombardment, or a source of ultraviolet rays.

The object arranged at the end of said object holder may be enclosed in said sluice chamber, sealed off from said tubular body by the object holder in the swung out position thereof. The object may thus be subjected to treatment and/or observation, and may be exchanged without affecting the high vacuum in said tubular body.

These and other features of the invention will be clearly understood from the following description by way of example and with reference to the accompanying drawings of some embodiments thereof, wherein.

Figure 4A:
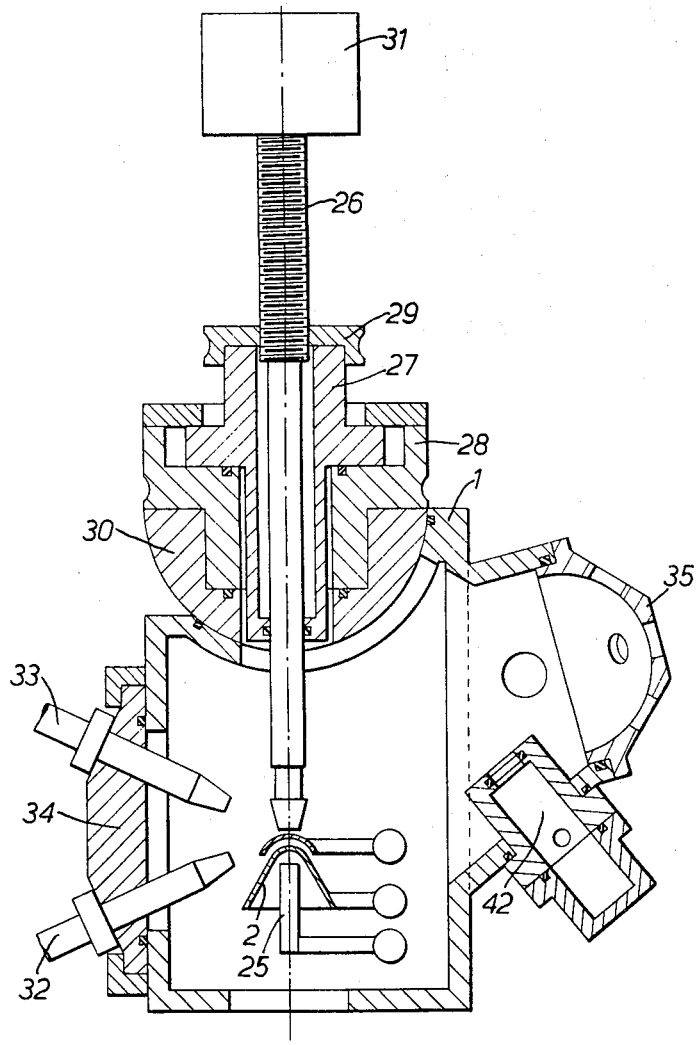
Figure 4B:
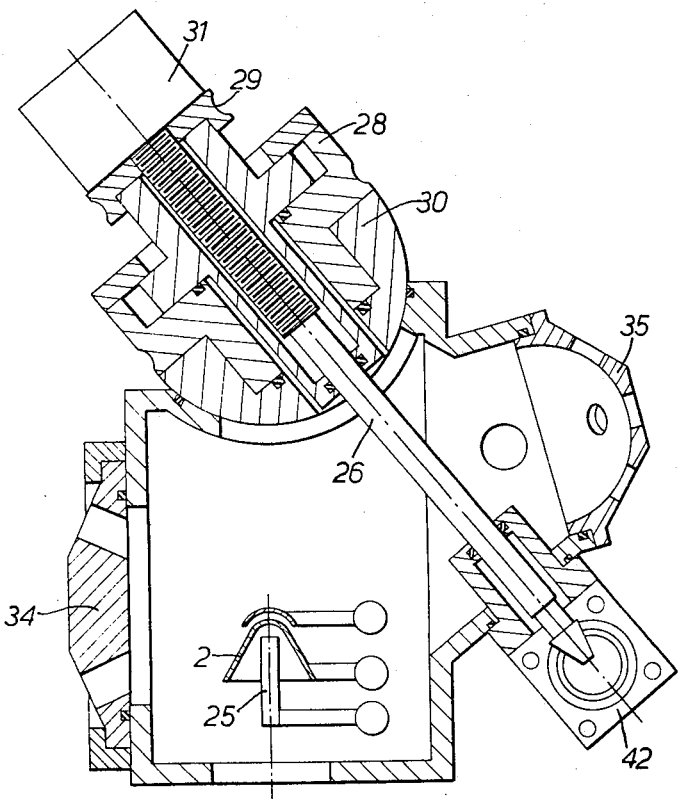
Figure 4D:
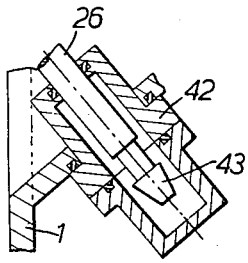
Figure 4F:
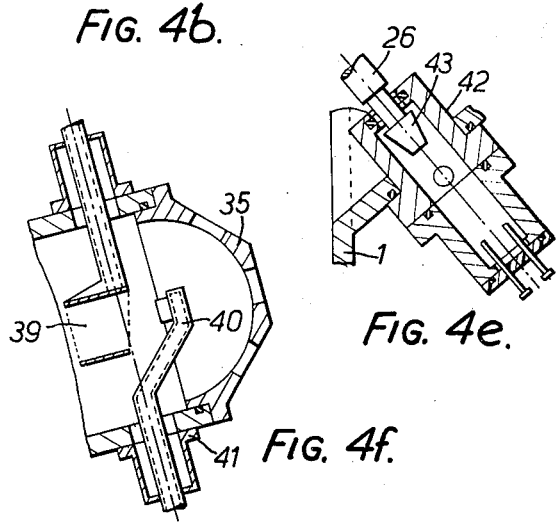
Figure 4E:
Figure 4C:
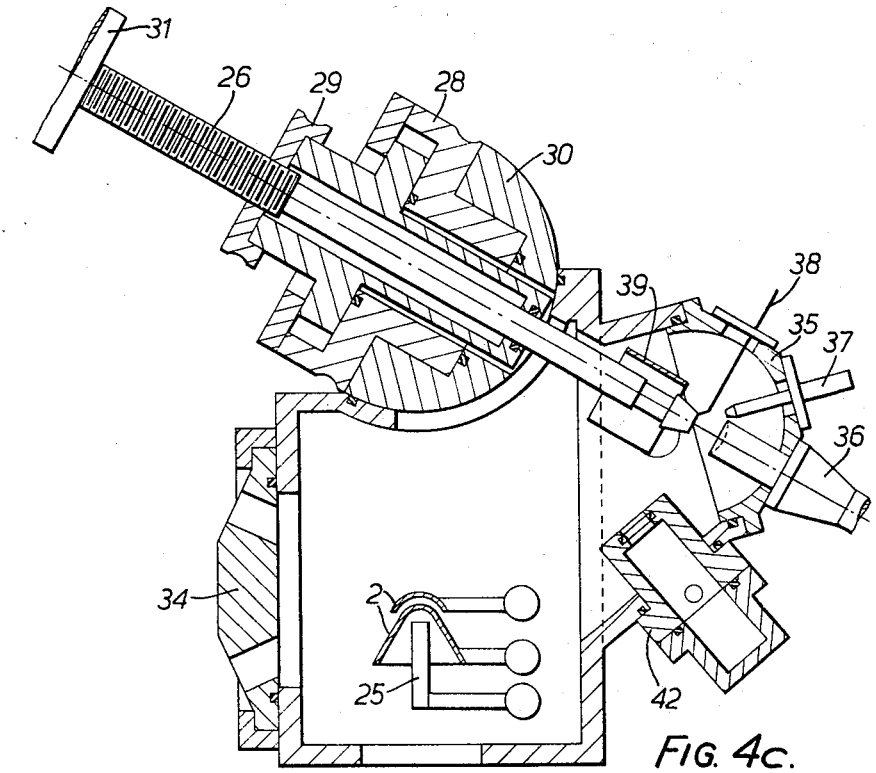

FIGS. 4a–c show diagrammatic sections of an embodiment in various working positions.

FIGS. 4e–f are diagrammatic sections of details of this embodiment.

Figure 5:
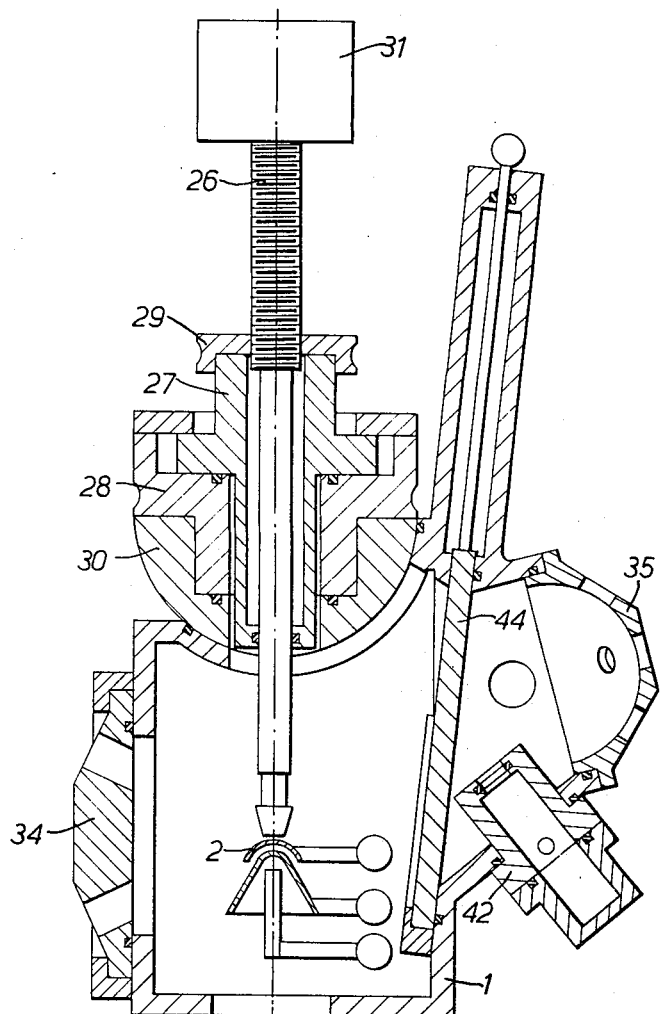

FIG. 5 is a diagrammatic section of a second embodiment.

Figure 6:
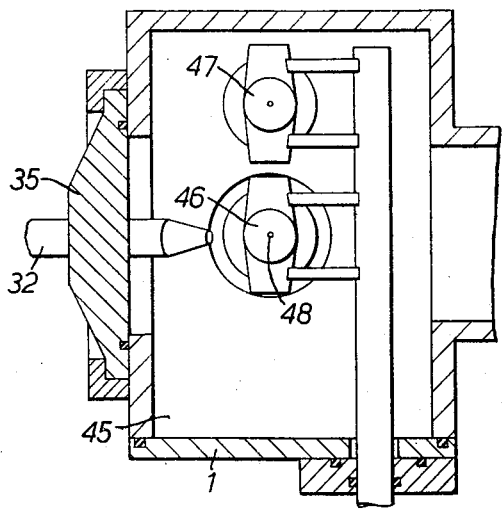

FIG. 6 is a diagrammatic section of a device for changing the objective lenses during prolonged operation.

Figure 7A:
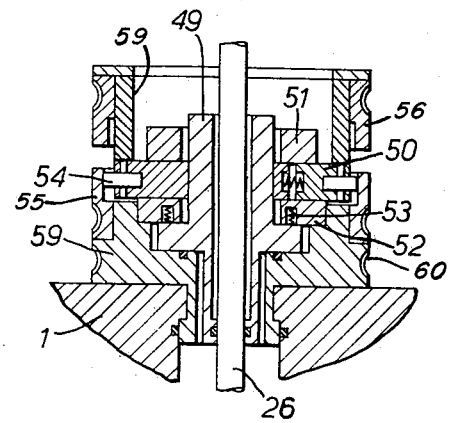

FIG. 7a is a diagrammatic longitudinal section and

Figure 7B:
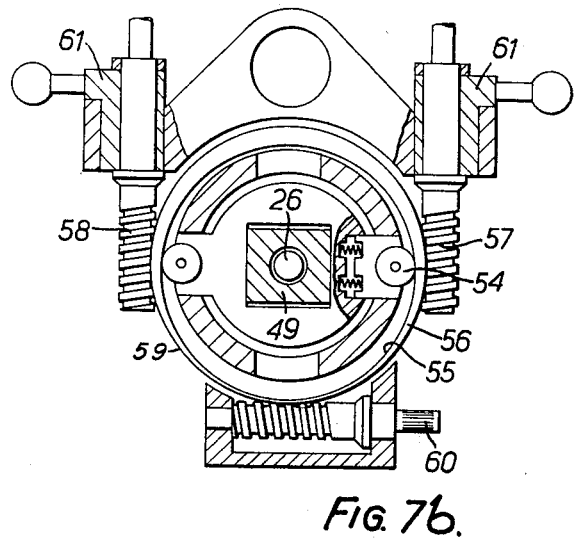

FIG. 7b is a sectional plan view of a compound table for use with the electron emission microscope.

FIG. 8 is a diagrammatic section of a third embodiment, and

FIG. 9 is a diagrammatic section of a fourth embodiment of the invention.

Figure 1:
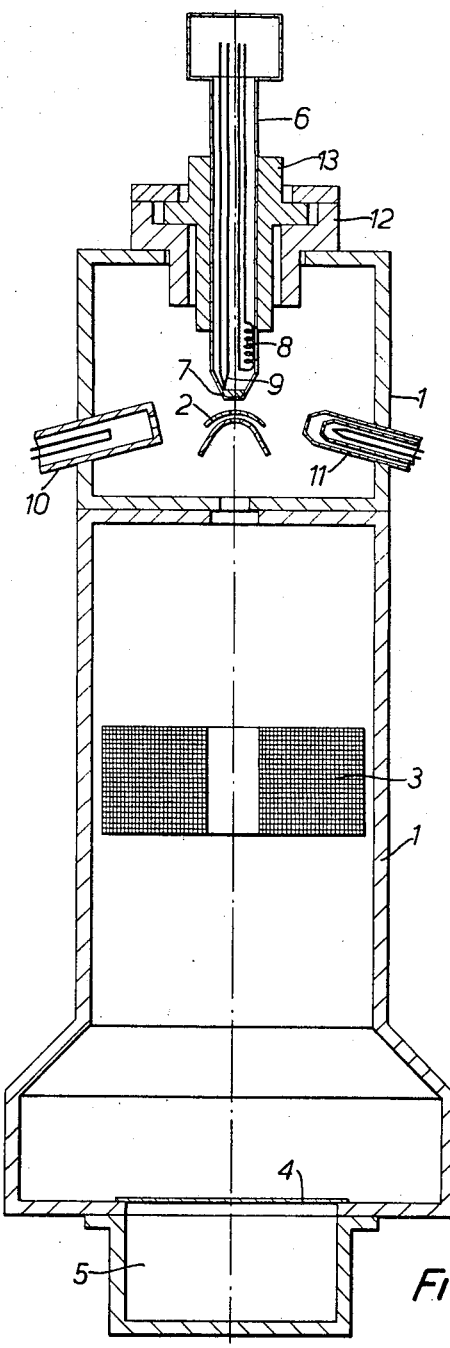
FIG. 1 is a diagram of an electron emission microscope of the type disclosed in U.S. Patent No. 3,219,817.
Figure 2:
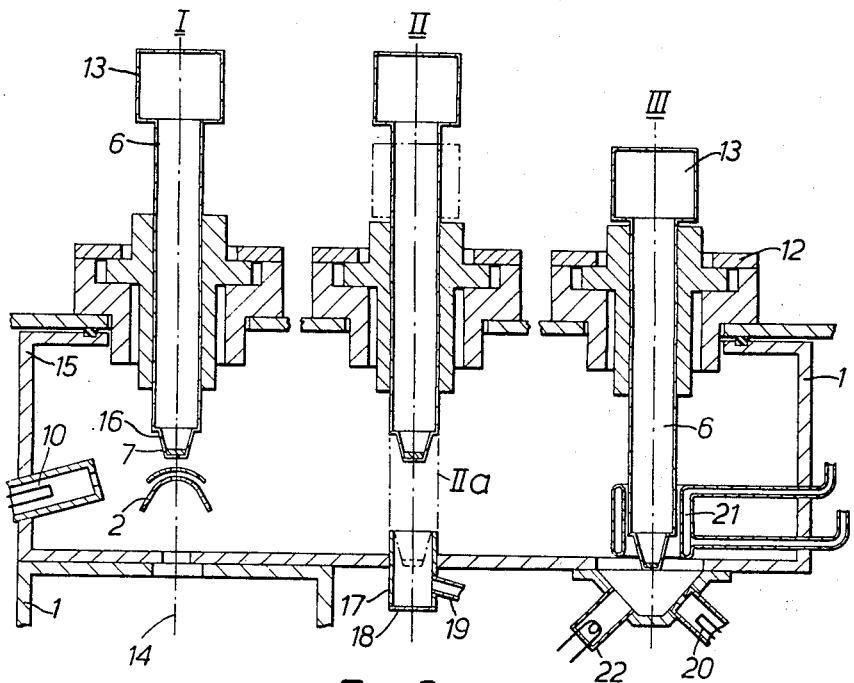
FIG. 2 is a principle diagram of a first embodiment of the invention showing four different positions of the object holder.

In the principle diagram shown in FIG. 2 the tubular body 1 has an enlargement at the level of the objective lens 2, which allows to swing the object holder 6 out of the optical axis 14 in a plane upon the closure plate 15 by a vacuum-sealed movement from position I for example into the position II and/or position III. The compound table 12 and the device 13 for rotating the object are shifted in unison with the object holder 6, so that the possibility of rotating the object is preserved in the swung-out positions. Since the supply of high voltage and of heating current to the object is made through the object holder 6 (FIG. 1) the object can be heated and set under high voltage also in the swung-out positions. In this principle the diagram consists in that the object holder 6 is shown slidable perpendicular to the surface of the object in the swung-out position, so that it can be brought for example into the lower position IIa (shown in chain-dotted lines). In practice, however, the object holder will be mounted pivotally. The object holder 6 is provided with a sealing surface 16, which in the position IIa rests on the vacuum seal of an air lock 17, so that the object is then enclosed in this air lock 17 and can be exchanged by taking off the lid 18 of the sluice chamber while the vacuum is preserved in the tubular body 1. A pre-evacuation port 19 allows the pre-evacuation of the air lock 17 after the closing of the lid 18 of this chamber.

This manner of introducing and removing the objects through an air lock has considerable advantages over the known manner of moving the entire object holder through an air lock. In particular, only a small area of the object holder is exposed to atmospheric pressure, which means that an operational vacuum can be re-established considerably quicker.

In the position III of the object holder 6 the object may for example be exposd to bombardment by an ion source 20 for the purpose of ion etching. This ion source is so arranged that it allows the ion bombardment of the object 7 under steeper angles of incidence than 30°, whereby conditions most favourable to ion etching are created. When the ion source 20 is operated for example with an accelerating voltage of several kilovolts the object 7 may be set at any desired negative high voltage between 0 and say 50 kv. whereby and after-acceleration of the ions is attained so that also as regards the etching voltage optimum conditions can be adjusted depending on the object and the etching result aimed at. In order to prevent at a ion incidence of e.g. 45° the formation of etching grooves in a predilected direction, continuous rotation of the object is maintained during the ion etching. It is also of a particularly advantageous effect that the scattered products of the ion etching are deposited predominantly in the enlargement of the tubular body 1 and at the worst the smallest proportion thereof can reach the objective lens 2.

For reinforcement of this effect, a cooling trap 21 is provided in the present embodiment which trap surrounds the object holder and serves for absorption of the scattered products of ion etching.

A source of evaporation 22, which is provided on the tubular body 1, allows for example the vacuum deposition of foreign substances on the surface of the object. For this deposition from the vapor phase it is likewise of great advantage that the evaporation products cannot reach the objective lens 2 directly. The cooling trap 21 reinforces here, too, the effect of swinging out the object holder about its pivot.

Figure 3A:
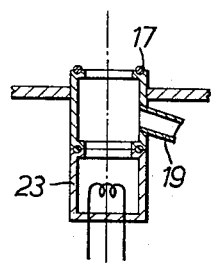
FIGS. 3a, 3b, are diagrammatic sections on a larger scale of details of FIG. 2, namely of the object air lock.
Figure 3B:
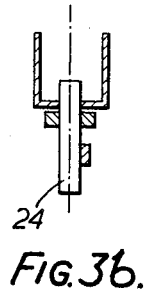

A particular embodiment of the air lock 17 for the object, is shown in FIG. 3a. Instead of the lid 18 of the air lock, for example a vapor deposition device 23 is provided, which allows the deposition from the vapor phase of substances, the presence of which in the tubular body is undesirable even in minor proportions, such as caesium, for example. Instead of the source of evaporation an optical microscope 24 (FIG. 3b) may be fitted for visually observing the surface of the object.

The object air lock 17 is made advantageously of corrosion-resistant materials. This allows to carry out in the air lock, when closed by the object holder 6, treatments of the object by corrosive gases—for example for chemical etching, while the object 7 may be brought up to any temperature desired during treatment. These gases are introduced and later sucked off through the pre-evacuation port 19, so that the object can be re-inserted after treatment into the tubular body in vacuo without being exposed to contact with air.

The air lock for the object and its seals as well as the associated vacuum valves are advantageously constructed in such a manner, that in the object air lock even pressures exceeding atmospheric pressure may be generated. This allows appropriate gas treatment of the object at elevated pressures.

A further embodiment is illustrated in FIGS. 4a–c In the tubular body 1, which has the enlargement required for swinging-out the object holder about its pivot axis, referred to hereinabove, there are mounted the objective lens 2 and a contrast electrode 25. The object holder 26 is mounted on a compound table 27, 28, the component 27 of which allows lateral translation, and the component 28 of which allows the rotation of the object. A further device 29 allows the sliding of the object holder in a direction perpendicular to the surface of the object. The object holder and compound table are mounted in a socket 30 of cylindrical shape which allows the swinging of the object holder about its pivot out of the optical axis and out of the range of the objective lens (FIGS. 4b and c) while the possibility of rotating the object is preserved. A multiple voltage supply (not shown) is provided in a plug 31 arranged on the object holder 26, which allows to supply the object with high voltage as well as with a heating current, so that even in the swung-out position the object can be kept heated and at a high voltage potential. In this embodiment the swing-out is effected by turning the object holder about an axis perpendicular to the optical axis.

For the purpose of releasing the secondary electrons from the object, in this embodiment an ion source 32, an electron source (not shown) and a source of ultra-violet radiation 33 are provided, which are mounted in unison on an flange indexing 34, whereby alternately one source after the other may be brought into action on the surface of the object. Each source is preferably attached on the indexing flange 34 by means of a centering device known per se. This allows the varying of the angle of incidence of the beams of any of the sources on the object between a tangential incidence and the maximum angle of incidence of say 25° as limited by the electrodes of the objective lens 2.

A further indexing flange 35 (FIG. 4c) may carry at 36 an ion source provided for carrying out the ion etching in the swung-out position of the object. The axis of rotation of this indexing flange 35 stands obliquely relative to the surface of the object, so that by turning this indexing flange the angle of etching may be varied between a tangential incidence and a perpendicular incidence.

The same indexing flange 35 serves for example for mounting a source of evaporation 36. By rotating this indexing flange, the angle of deposition from the vapor phase is varied in the same manner as described with reference to ion etching.

For observing the offset of ion etching and vapor deposition, preferably an optical microscope 37 is used, which is arranged on the center line of the indexing flange 35 in such a manner that observation is maintained when the indexing flange is turned.

On the same indexing flange 35 preferably a temperature feeler 38 is mounted, which can be brought into contact with the surface of the object when the object holder is swung out.

The cooling trap 21, which is used preferably when carrying out ion etching and deposition from the vapor phase and which is cooled for example by means of liquid nitrogen, is arranged around the object also in this embodiment and is denoted by 39. It is more clearly shown in FIG. 4f in a section perpendicular to FIG. 4c.

Moreover in FIG. 4f a cooling finger 40 is shown, which is cooled likewise for example by means of liquid nitrogen, and which is mounted rotatably in its passage 41. This cooling finger is brought in front of the object by turning. When the object is brought into immediate vicinity of this cooling finger 40 by shifting the object holder 26 in a direction perpendicular to the surface of the object, cooling of the object is speeded up; by touching the surface of the object with the cooling finger, which has a plane face opposite the object, the latter is quenched. In this manner a control of the rate of cooling is attained, which is extremely important for metallurgical investigations.

As in the principle diagram, an object air lock 42 is provided here, which is shown in FIG. 4b in the open condition for changing the object; is shown in FIG. 4d in the closed condition for changing the object; is shown in FIG. 4d in the closed condition for carrying out a gas treatment at any pressure desired, and is shown in FIG. 4a in the condition for depositing substances from the vapor phase which are undesirable in the tubular body. The sealing face 43 is formed in this embodiment by the external cylindrical surface of the object holder 26.

A further embodiment is illustrated in FIG. 5. It is distinguished in that the space, wherein the object is placed in the swung-out position of the object holder 26, can be separated in a vacuum-tight manner from the space, wherein the objective lens 2 is placed, by means of a slide plate valve 44. Thereby vapors, which have condensed on the walls of the enlargement of the tubular body when treating the object in the swung-out position, are prevented from reaching the objective lens 2 when carrying out the electron emission microscopic observation.

In very much prolonged investigations fouling of the objective lens by evaporation from the object can occur during the electron-emission microscopic observation, in spite of the spatial separation according to the present invention of the microscope chamber from the object-treatment chamber. Accordingly a device 45 (FIG. 6) is used with advantage wherein two or more objective lenses 46, 47 can be brought successively into the optical axis 48. The objective lens 47, which is to be used later, is not affected by fouling during the operation of the objective lens 46, and allows a continuation of the investigations without breaking the vacuum after the lens 46 has become unusuable.

In the embodiments described the axis of rotation for turning the object is shifted by the movement of the compound table and then no longer co-incides with the optical axis. Accordingly when using the microscope the spot observed on the object normally tends to recede from the field of vision and has to be kept in the field of vision by continuous follow-up movements of the compound table. FIGS. 7a and 7b show an embodiment of the compound table, which allows to maintain co-incidence of the axis of rotation with the optical axis, and thus considerably simplifies and rationalises the operation of the electron emission microscope. The object holder 26 is for example mounted in a carriage 49, which is in turn mounted in two guiding slides 50 and 51 arranged movably perpendicular to each other, and kept in contact with one another by means of a presser plate 52 and sets of compression springs 53 embedded therein. Each of these slidable guides carries diametrically opposite rollers 54, which run on the inside of an eccentric guide cam 55, 56, respectively, capable of being turned by a worm 57, 58, respectively. Only the rollers 54 of the guide 50 are shown, those of the guide 51 being on a diameter perpendicular to the plane of the drawing in FIG. 7a. Mutually independent rotation of these two guide cams may cause any desired translational movement of the slidable guides 50, 51 and accordingly any desired displacement of the object holder 26, and thus of the object, in two mutually perpendicular co-ordinate directions. The whole compound table rests on a cylinder 59, which is also rotatable and capable of being turned by a drive 60 through a worm gearing. During this rotation of the cylinder 59, the worms 57, 58 driving the guide cams 55, 56, respectively are disengaged by means of an eccentric 61. The rotation of the cylinder 59 accordingly effects a rotation of the object about the axis of this cylinder 59. Once the cylinder 59 is centered on the optical axis of the microscope, the axis of rotation of the object and the optical axis subsequently co-incide and the object always rotates about the section of the object just under observation, without requiring any follow-up movement. This characteristic remains preserved according to the invention even when swinging the object holder out of the optical axis and out of the range of the objective lens, and then swinging it back into the optical axis, when co-incidence is again assured. The mechanically achievable accuracy of the device described does not assure in any case an accurate co-incidence of the axis of rotation and of the optical axis. However, such a degree of accuracy is attainable without difficulty to such a degree that the center of rotation in the electron image is kept in the field of observation of the object.

The electron emission microscope according to the present invention may be provided with electron diffraction means arranged in said tubular body, wherein also an X-ray feeler may be provided.

An embodiment of the invention, in which an electron diffraction device is provided for investigating the surface of the object, is shown in FIG. 8. Therein the tubular body is denoted 61, a pivotable socket is denoted 62 (corresponding to item 30 in FIG. 4a, the pivot axis lying, however, in FIG. 8 in the plane of the drawing), which carries the object holder 63 with compound table 64, 65 for lateral translation and a device 65 for the rotation of the object 66, in which the electron-optical lens arrangement 67 for producing the emission image is juxtaposed. In order to be able to subject the object 66 at the same time to investigation by means of electron diffraction, in a second socket 68 with high voltage connection 69 a thermionic cathode 70 is provided, the electrons emerging in operation from this cathode being focused by the magnetic lens 71 on the surface of the object 66, which they glance. In a manner known per se an electron diffraction image is thus produced on the luminescent screen 72, which can be observed simultaneously with the emission image produced by the lens system 67.

A further development of the invention is shown in FIG. 9. Similar to the embodiments of FIGS. 4 and 8 a pivotable socket (denoted 80 as a whole) is here provided, which carries the object holder and is provided with means for lateral translation and rotation of the object. In this embodiment the surface of the object 81 can be subjected in the swung-out position illustrated to bombardment by electrons from a source of an electron beam 82 (constructed similar to that described with reference to FIG. 8), the electrons impinging the surface of the object at an angle of incidence of about 45°.

By the impinging electrons X-rays are released from the surface of the object, part of which enters an X-ray spectrometer diagrammatically indicated at 83. This spectrometer may be of any known type and has the object of analysing the X-rays as regards their spectroscopic composition, wherefrom deductions of the chemical composition of the sample investigated in the area of the surface of the object 81 can be made which is impinged upon by the electron beam of the electron beam generator 82.

The auxiliary devices referred to in the claims include e.g. the source of evaporation 22; vapor deposition device 23; optical microscope 24; ion source 32; source of ultra-violet radiation 33; cooling finger 40; as described hereinabove with reference to the accompanying drawings.

The physical and chemical treatment referred to in the claims includes e.g. exposure to ultra-violet radiation; bombardment by electrons or ions; heating; cooling; exposure to chemically active gases.

The luminescent screen 4 and the photographic device 5 shown in FIG. 1 may be attached to the bottom of the casing 1 in the optical axis thereof in the principle diagram of FIG. 2 and to any of the embodiments illustrated in FIGS. 4a, 4b, 4c, 5, 8 or 9, where they are not shown.

While we have described herein and illustrated in the accompanying drawings what may be considered typical and particularly useful embodiments of our said invention we wish it to be understood that we do not limit ourselves to the particular details and dimensions described and illustrated; for obvious modifications will occur to a person skilled in the art.

What we claim as our invention and desire to secure by Letters Patent is:

1. An electron microscope comprising in combination: an evacuable tubular body, at least one objective electron lens and one projection electron lens arranged in said tubular body, a compound table arranged at one end of said tubular body outside thereof, an object holder mounted pivotally and rotatably on said compound table capable of being adjusted in two perpendicular co-ordinate directions by said compound table and to be swung into and out of the optical axis of the microscope as defined by said objective and projection lenses, a rotary driving means connected with said object holder and capable in operation of rotating the same about its axis, means for setting in operation the object attached to said object holder at a high negative voltage potential relative to said tubular body, means for heating in operation said object, a source of radiation in operation producing a beam directed on the surface of said object, an air lock arranged on said tubular body in a direction towards the pivotal mounting of said object holder at an angle to the optical axis of the microscope and an image receiving device arranged at the other end of said tubular body.

2. An electron emission microscope as claimed in claim 1, wherein said source of radiation is a source of ion bombardment.

3. An electron emission microscope as claimed in claim 1, wherein said source of radiation is a source of electron bombardment.

4. An electron emission microscope as claimed in claim 1, wherein said source of radiation is a source of ultra-violet rays.

5. An electron emission microscope as claimed in claim 1, wherein said object holder is longitudinally slidable in the optical axis as well as in the swung-out position and wherein said air lock is adapted to be sealed by the end of said object holder by sliding the same towards said chamber in a swung-out position of the holder, the object attached on said end being then inside said air lock.

6. An electron emission microscope as claimed in claim 1, comprising means for physical and chemical treatment of the object attached to the end of said object holder in the swung-out position of the latter.

7. An electron emission microscope as claimed in claim 1, comprising optical means for the visual observation of the object in the swung-out position of said object holder.

8. An electron emission microscope as claimed in claim 1, wherein said air lock comprises means for exchanging in the swung out position of the object holder, the object attached to the end of said object holder when the air lock is sealed against said tubular body.

9. An electron emission microscope as claimed in claim 1, wherein said object holder has a plurality of differently swung-out positions, and comprising auxiliary devices each in alignment with one of said swung-out positions.

10. An electron emission microscope as claimed in claim 1, wherein said air lock is capable of being sealed against said tubular body in a vacuum-tight manner and is provided with a port for establishing an atmosphere in said air lock different from that in said tubular body, when inserted in said air lock.

11. An electron emission microscope as claimed in claim 1, comprising an ion source arranged on said tubular body, in operation producing an ion beam impinging on the surface of the object at angles of incidence exceeding 3 degrees in a swung-out position of said object holder.

12. An electron emission microscope as claimed in claim 1, comprising a cooling trap arranged on said object holder, in operation cooling said object while subjected to ion bombardment.

13. An electron emission microscope as claimed in claim 1, comprising a source of evaporation allowing a vacuum vapor deposition on the surface of said object in a swung-out position of said object holder.

14. An electron emission microscope as claimed in claim 1, comprising a source of evaporation exchangeably mounted in said air lock allowing a vacuum vapor deposition on the surface of said object when inserted in said air lock in a swung-out position of said object holder.

15. An electron emission microscope as claimed in claim 1, comprising an optical microscope exchangeably mounted in said air lock and allowing visual observation of the surface of the object while the latter is inserted in said air lock.

16. An electron emission microscope as claimed in claim 1, wherein the inner wall surfaces of said air lock consist of a corrosion-resistant material.

17. An electron emission microscope as claimed in claim 1, wherein said air lock is constructed and sealed so as to withstand internal pressures exceeding the atmospheric pressure.

18. An electron emission microscope as claimed in claim 1, wherein said object holder is pivotal about an axis perpendicular to said optical axis of the microscope.

19. An electron emission microscope as claimed in claim 1, comprising an indexing member mounted rotatably under vacuum-sealed conditions on said tubular body, at least two sources of radiation mounted on said indexing member in such a manner that by turning said indexing member the beams generated by said sources in operation are alternately made to impringe on the surface of the object attached to said object holder.

20. An electron emission microscope as claimed in claim 1, comprising centering devices mounted rotatably on said tubular body, a source of radiation eccentrically mounted on each of said centering devices and producing a beam capable of being directed on the surface of the object attached to said object holder, the point of impact of said beam on said surface being adjustable by turning said centering device about its axis.

21. An electron emission microscope as claimed in claim 1, comprising an indexing member mounted rotatably under vacuum-sealed conditions on said tubular body about an axis positioned obliquely to the surface of an object attached to said object holder, and a radiation source mounted on said indexing member and in operation generating a beam impinging said surface at an angle of incidence, which is variable by turning said indexing member.

22. An electron emission microscope as claimed in claim 1, comprising an indexing member mounted rotatably on said tubular body under vacuum-sealed conditions about an axis positioned obliquely to the surface of an object attached to said object holder and a source of evaporation mounted on said indexing member capable of depositing vapor in vacuo on said surface in one position of said indexing member.

23. An electron emission microscope as claimed in claim 1, comprising a temperature feeler arranged on said tubular body capable of contacting the surface of the object in the swung-out position of said object holder.

24. An electron emission microscope as claimed in claim 1, comprising a cooling finger mounted on said tubular body and capable of being brought alternately into immediate vicinity of and into contact with the surface of the object in a swung-out position of said object holder.

25. An electron emission microscope as claimed in claim 1, comprising a slide plate valve arranged on said tubular body capable of separating in a vacuum-tight manner the space, in which said objective lens is contained in a swung-out position of said object holder.

26. An electron emission microscope as claimed in claim 1, comprising a plurality of at least two objective lenses mounted movably in said tubular body capable of being brought in vacuo optionally into the optical axis of the microscope.

27. An electron emission microscope as claimed in claim 1, comprising an electron deflecting means arranged in said tubular body.

28. An electron emission microscope as claimed in claim 1, comprising an X-ray feeler arranged on said tubular body.

29. An electron emission microscope as claimed in claim 1, comprising an optical device for the visual observation of the surface of the object having an optical axis substantially co-inciding with the axis of rotation of said object holder, so that the observation of the object remains unaffected by the rotation of said object holder about its axis.

30. An electron emission microscope as claimed in claim 29, wherein the co-incidence of the optical axis of said visual microscope with the axis of rotation of said pivotally mounted object holder is re-established after swinging out the object holder and returning the same to the optical axis of the electron emission microscope, without requiring re-adjustments.

References Cited

UNITED STATES PATENTS

| | | | |
|---|---|---|---|
| 2,362,515 | 11/1944 | Weigend | 250—49.5 |
| 3,219,817 | 11/1965 | Möllenstedt | 250—49.5 |
| 3,363,098 | 1/1968 | Wegmann | 250—49.5 |

ARCHIE R. BORCHELT, Primary Examiner

A. L. BIRCH, Assistant Examiner